United States Patent [19]
Wheeler

[11] Patent Number: 4,482,935
[45] Date of Patent: Nov. 13, 1984

[54] CERAMIC CAPACITORS AND DIELECTRIC COMPOSITIONS

[75] Inventor: Jennifer M. Wheeler, London, England

[73] Assignee: ITT Industries, Inc., New York, N.Y.

[21] Appl. No.: 600,601

[22] Filed: Apr. 17, 1984

Related U.S. Application Data

[63] Continuation of Ser. No. 388,571, Jun. 14, 1982, abandoned.

[30] Foreign Application Priority Data

Jul. 3, 1981 [GB] United Kingdom ................. 8120605

[51] Int. Cl.$^3$ ........................ H01G 4/12; C04B 35/46
[52] U.S. Cl. ...................................... 361/321; 427/79; 501/135; 501/136
[58] Field of Search ................ 501/136, 135; 361/321; 427/79

[56] References Cited

U.S. PATENT DOCUMENTS

| | | | |
|---|---|---|---|
| 4,048,546 | 9/1977 | Bouchard | 361/321 |
| 4,081,857 | 3/1978 | Hanold | 361/321 |
| 4,223,369 | 9/1980 | Burn | 361/321 |
| 4,339,544 | 7/1982 | Sakabe | 361/321 |

FOREIGN PATENT DOCUMENTS

| | | | |
|---|---|---|---|
| 44-17103 | 7/1969 | Japan | 501/135 |
| 45-23264 | 8/1970 | Japan | 501/135 |
| 46-1224 | 1/1971 | Japan | 501/135 |
| 52-22119 | 6/1977 | Japan | 501/136 |
| 56-103802 | 8/1981 | Japan | 501/135 |
| 57-25606 | 2/1982 | Japan | 501/136 |

Primary Examiner—Mark Bell
Attorney, Agent, or Firm—John T. O'Halloran; Peter R. Ruzek; Mary C. Werner

[57] ABSTRACT

A dielectric composition which is particularly suitable for the manufacture of ceramic capacitors, comprises lead magnesium niobate with additions of one or more lead titanate, lead stannate, or lead zirconate. The composition can be fired at a temperature between 950° and 1100° C., which is lower than the conventional firing temperatures of 1200° to 1400° C. The lower firing temperature means that, in the case of multilayer ceramic capacitors, the internal electrodes can be made of cheaper materials than previously with resultant materials and process cost savings. Some of the compositions exhibit higher dielectric constants than conventional Z5U ceramics, which means that capacitor device size can also be reduced.

9 Claims, No Drawings

CERAMIC CAPACITORS AND DIELECTRIC COMPOSITIONS

This application is a continuation of application Ser. No. 388,571, filed 6/14/82, now abandoned.

BACKGROUND OF THE INVENTION

This invention relates to ceramic capacitors and in particular, but not exclusively, to multilayer ceramic capacitors and dielectric compositions for use therein.

A multilayer ceramic capacitor basically comprises a stack comprising a plurality of dielectric members formed of a ceramic material, with electrodes positioned between the members. The electrodes may be screen-printed onto the ceramic material, in the unfired state thereof, using conductive inks, such as plantinum, palladium and/or gold inks. A stack of screen-printed dielectric members is assembled, pressed together, cut into individual components if appropriate, and fired.

With the conventionally employed dielectrics, the capacitors must be fired at temperatures of the order of 1200°–1400° C., which means that the then internal electrodes must be of a suitable material to withstand such temperatures and that expensive noble metals such as platinum and palladium must therefore be used. The capacitors are fired at temperatures between 1200°–1400° C. until sintering occurs, in order to ensure non-porosity. The internal electrodes may be of rectangular form and cover the whole part of the area of the adjacent dielectric layers. The internal electrodes in successive layers may be laterally stepped relative to one another or have elongate portions which cross one another, as described in British application No. 7,841,677 (Ser. No. 2,032,689A) (A. L. Oliver—G. Mills 1-1).

As mentioned above, the conventional materials used for the dielectric ceramic involve high firing temperatures (1200° to 1400° C.) and mean that expensive noble metals have to be used for the internal electrodes. However, if the firing temperature could be reduced, by a suitable choice of the dielectric, then internal electrodes with a high silver content (50–100% silver) could be used, thus reducing costs for materials and manufacture.

SUMMARY OF THE INVENTION

Accordingly, it is a general object of the present invention to avoid the disadvantages of the prior art.

More particularly, it is an object of the present invention to provide a dielectric composition which can be fired at a significantly lower temperature than conventional dielectric composition.

Still another object of the present invention is to develop a ceramic capacitor, especially a multilayer ceramic capacitor, which can be fired at a much lower temperature than conventional ceramic capacitors, so that electrode materials with a lower melting point than before can be used.

It is yet another object of the present invention to devise a method of manufacturing multilayer ceramic capacitors resulting in high-quality capacitors at reduced cost.

In pursuance of these objects and others which will become apparent hereafter, one feature of the present invention resides in a dielectric composition capable of being fired at a temperature between 950° and 1100° C., this composition comprising lead magnesium niobate and at least one member selected from the group consisting of lead titanate, lead stannate, and lead zirconate. In this composition, lead magnesium niobate advantageously constitutes between 60 and 99% by weight especially between 83.3 and 94.1% by weight, of the composition. The dielectric constant of this dielectric composition after firing is advantageously between 7500 and 10000. Particularly advantageous results are obtained when lead magnesium niobate constitutes between 83.3 and 94.1% by weight, lead titanate between 0 and 8.3% by weight, lead stannate between 0 and 11.1% by weight, and lead zirconate between 0 and 9.1% by weight, of the composition.

According to another advantageous aspect of the invention, there is provided a ceramic capacitor comprising a dielectric composition fired at a temperature between 950° and 1100° C. and including lead magnesium niobate and at least one member selected from the group consisting of lead titanate, lead stannate, and lead zirconate. This ceramic capacitor may advantageously further comprise internal electrodes of high silver contents which are fired together with the dielectric composition. A particularly advantageous application of the present invention is in a multilayer ceramic capacitor which then comprises a plurality of layers of a dielectric composition fired at a temperature between 950° and 1100° C. and including lead magnesium niobate and at least one member selected from the group consisting of lead titanate, lead stannate, and lead zirconate, and a plurality of internal electrodes of high silver contents arranged between said dielectric composition layers. An additional feature of the present invention can be found in a method of manufacturing a multilayer ceramic capacitor, comprising the steps of depositing at least one electrode on each of a plurality of sheet-shaped dielectric members made of a dielectric composition including lead magnesium niobate and at least one member selected from the group consisting of lead titanate, lead stannate, and lead zirconate; assembling the plurality of the sheet-shaped dielectric members into a stack; and firing the stack at a temperature between 950° and 1100° C. The stack may be pressed together and/or divided into individual capacitor components prior to the firing step.

DETAILED DESCRIPTION OF THE PREFERRED EMBODIMENTS

We have found that dielectrics with various compositions can be made that fire at temperatures between 950° and 1100° C., which dielectrics are particularly suitable for ceramic capacitors, and some of which have dielectric constants of 7500–10000. These materials can be used for ceramic capacitors with internal electrodes of very high silver content. By the expression "high silver content" is meant 50–100% silver. Thus, the electrodes may comprise, for example, 70% silver and 30% palladium. The conventionally employed ceramics (U.S. coding Z5U) are not compatible with high silver content electrodes and usually have dielectric constants lower than 7500–1000. The electronics industry generally requires smaller components, and smaller capacitors can be obtained by producing dielectrics with a higher dielectric constant than those currently used i.e. the Z5U ceramics. Examples of the dielectric compositions proposed by the present invention are given in the following table I. The dielectric is based on lead magnesium niobate, with additions of one or more of the following: lead titanate, lead stannate or lead zirconate.

The dielectric may comprise between 60 and 99% by weight of lead magnesium niobate.

TABLE I

| | Composition (% by weight) | | | | | | Firing Temperature |
|---|---|---|---|---|---|---|---|
| | A | B | C | D | K | tan δ | °C. |
| 1 | 88.9 | 0 | 11.1 | 0 | 8000 | 0.3 | 950 |
| | | | | | 8500 | 0.1 | 1000 |
| | | | | | 8000 | 0.2 | 1050 |
| 2 | 90.9 | 0 | 9.1 | 0 | 7500 | 0.4 | 950 |
| | | | | | 8500 | 0.3 | 1000 |
| | | | | | 7700 | 0.25 | 1050 |
| 3 | 94.1 | 0 | 5.9 | 0 | 9000 | 1 | 950 |
| | | | | | 9000 | 0.3 | 1000 |
| | | | | | 9000 | 0.15 | 1050 |
| | | | | | 9000 | 0.5 | 1100 |
| 4 | 88.9 | 0 | 0 | 11.1 | 10000 | 0.38 | 1050 |
| | | | | | 7750 | 2 | 1100 |
| 5 | 90.9 | 0 | 0 | 9.1 | 4000 | 1.9 | 1000 |
| 6 | 94.1 | 0 | 0 | 5.9 | 9000 | 1.9 | 950 |
| | | | | | 8000 | 1.2 | 1000 |
| | | | | | 9500 | 0.95 | 1050 |
| | | | | | 10000 | 0.5 | 1100 |
| 7 | 83.3 | 8.3 | 8.3 | 0 | 6500 | 1.9 | 950 |
| | | | | | 8000 | 0.9 | 1000 |
| | | | | | 9000 | 1.1 | 1050 |

A-lead magnesium niobate Pb(Mg$_{\frac{1}{3}}$Nb$_{\frac{2}{3}}$)O$_3$
B-lead titanate PbTiO$_3$
C-lead stannate PbSnO$_3$
D-lead zirconate PbZrO$_3$ Ceramic bodies formed of these compositions were fired for one hour at the quoted temperatures, and the electrical properties tan δ (dielectric loss angle) and K (dielectric constant) measured. The temperature coefficients of capitance (not shown in the table) were measured and found to have the same characteristics as Z5U ceramics, namely between 10° and 85° C. the capacitance variation remains within the band +22% to −56% of the 25° C. value. Whilst specific mention has been made of multilayer capacitors with internal electrodes, the dielectric material can alternatively be used with other ceramic capacitor types, with or without electrodes that are fired with the ceramic, and provide similar cost reductions and smaller devices.

While specific reference has been made to the use of high silver content electrodes, the dielectric composition may be used with other electrode materials, such as platinum or palladium.

A method of the present invention for manufacturing a multilayer ceramic capicator using the dielectric compositions described above may comprise the steps of screen printing a plurality of electrodes on a plurality of unfired dielectric sheets with a high silver content ink; assembling a stack of such printed sheets, with the electrodes of alternate layers arranged relative to one another as appropriate to the particular construction employed, for example laterally stepped or overlapping corss-wise; pressing the sheets together with extra blank ceramic sheets applied to the top and bottom of the stack to give an adequate voltage margin, if required; cutting the sheets to form individual capacitor components; and firing the individual components at a temperature between 950° and 1100° C. Subsequently the electrodes between every other sheet may be conventionally connected by the appropriate application of conductive paint, for example, to opposite side faces of the stack.

While I have described above the principles of my invention in connection with specific apparatus, it is to be clearly understood that this description is made only by way of example and not as a limitation to the scope of my invention as set forth in the accompanying claims.

I claim:

1. A dielectric composition capable of being fired at a temperature between 950° and 1100° C., consisting essentially of:
   lead magnesium niobate having the formula Pb(Mg$_{\frac{1}{3}}$Nb$_{\frac{2}{3}}$)O$_3$ constituting between 60% and 99% by weight of the composition; and
   at least one member selected from the group consisting of lead titanate, lead stannate, and lead zirconate constituting between about 1% and 40% by weight of the composition.

2. The dielectric composition as defined in claim 1, wherein lead magnesium niobate constitutes between 83.3 and 94.1% by weight of the composition.

3. The dielectric composition as defined in claim 1, wherein the dielectric constant after firing is between 7500 and 10000.

4. The dielectric composition as defined in claim 1, wherein lead magnesium niobate constitutes between 83.3 and 94.1% by weight, lead titanate between 0 and 8.3% by weight, lead stannate between 0 and and 11.1% by weight, and lead zirconate between 0 and 9.1% by weight, of the composition.

5. A ceramic capacitor comprising a dielectric composition fired at a temperature between 950° and 1100° C. and consisting essentially of lead magnesium niobate having the formula Pb(Mg$_{\frac{1}{3}}$Nb$_{\frac{2}{3}}$)O$_3$ constituting between about 60% and 99% of the weight of the composition and at least one member selected from the group consisting of lead titanate, lead stannate, and lead zirconate, constituting between about 1% and 40% by weight of the composition.

6. The ceramic capacitor as defined in claim 5, and further comprising internal electrodes of high silver contents which are fired together with the dielectric composition.

7. A method of manufacturing a multilayer ceramic capacitor, comprising the steps of
   depositing at least one electrode on each of a plurality of sheet-shaped dielectric members made of a dielectric composition consisting essentially of lead magnesium niobate having the formula Pb(Mg$_{\frac{1}{3}}$Nb$_{\frac{2}{3}}$)O$_3$ constituting between 60% and 99% by weight of the composition and at least one member selected from the group consisting of lead titanate, lead stannate, and lead zirconate, constituting between 1% and 40% by weight of the composition;
   assembling the plurality of the sheet-shaped dielectric members into a stack; and
   firing the stack at a temperature between 950° and 1100° C.

8. The method as defined in claim 7, and further comprising the step of pressing the stack together prior to said firing step.

9. The method as defined in claim 7, further comprising the step of dividing the stack into individual capacitor components; and wherein said firing step including firing each of the individual capacitor components.

* * * * *